INVENTORS
Bartel J. Disanto
BY George H. Weis
James K. Kent
ATTORNEY

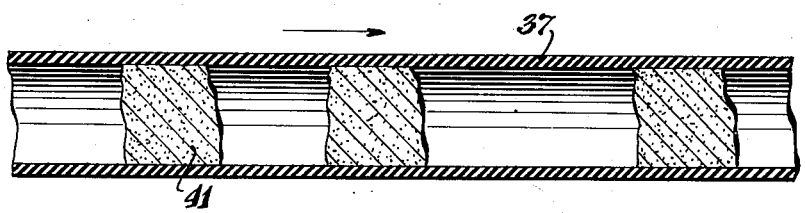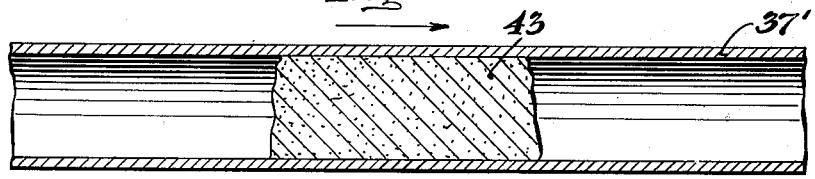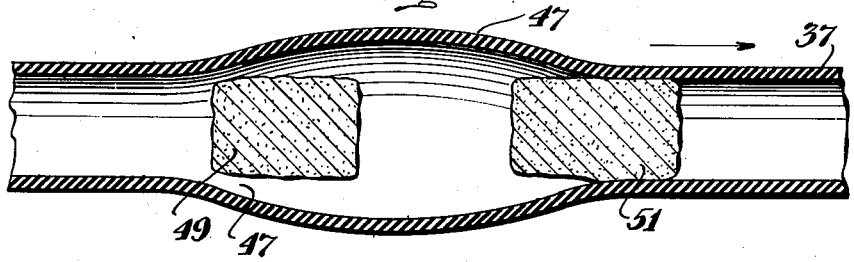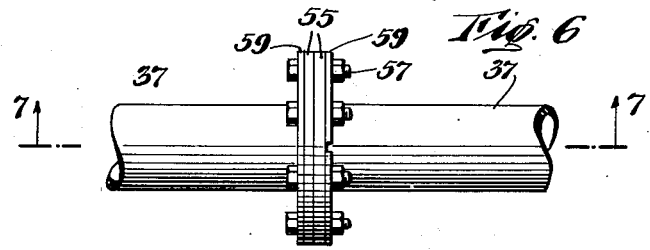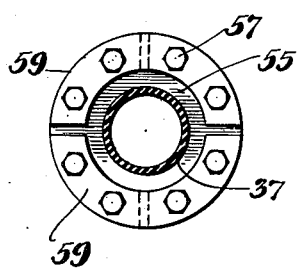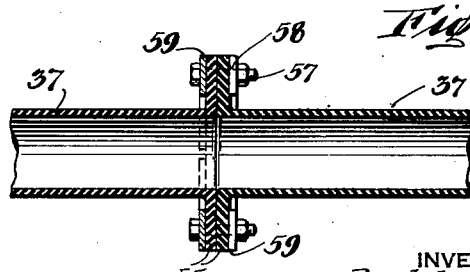

Patented Nov. 4, 1941

2,261,347

UNITED STATES PATENT OFFICE 2,261,347

DUST HANDLING EQUIPMENT

Bartel J. Di Santo, Woodbridge, and George H. Weis, Colonia, N. J., assignors to American Smelting and Refining Company, New York, N. Y., a corporation of New Jersey Application September 26, 1940, Serial No. 358,498

8 Claims. (Cl. 302—64)

The handling of finely-divided industrial products in their dust-like condition has received a considerable amount of attention and is of importance in view of the many materials which are obtained and handled in this dust-like condition.

The handling of these products involves generally their being loaded in bulk in cars or the like for shipment, or, in the case of some such products, it is customary to put the same into bags or the like prior to their being shipped to a distributor or consumer; and the finely divided condition of such products and the necessity for handling them in a substantially dry state involve considerable operating difficulties, especially where the material has a tendency to compact or "ball up" during handling.

Since the packing or shipping station for such materials usually is of necessity some distance from the storage bins containing the materials, means must be provided for the transfer of large quantities of such material from the storage bin to the said station.

Such means customarily include some form of portable dust-collecting and blowing mechanism which is adapted to be moved to any portion of the storage bin to collect accumulated dust-like materials contained in the bin, and to blow the said materials through suitable pipes connected to the blowing mechanism and leading therefrom to the loading or packing station.

As has been indicated above, some of these dust-like products are compactible and tend to "ball up" in the conveying pipes. Among commonly occurring dust products that possess this property are talc, pigments, and high-lead dusts. Such materials are composed of particles which stick or pack together under even slight compression; and when they are being handled in the above-indicated manner, it is a frequent occurrence for them to stick together in the pipes under the air pressure of the blower, and plug the system.

Such occurrences cause frequent interruptions to operation and frequent shut-downs, as usually it is necessary to dismantle the pipe system in order to remove mechanically such obstructions. It has been found in practice that such installations are interrupted so much in their operation, as to render it virtually impossible to do anything with the equipment, as it is shut down more than it is in operation, and with some materials such equipment does not operate at all.

The present invention provides improvements in dust handling equipment which obviate the above difficulty.

Briefly stated, the invention comprises the provision of an elastic wall dust conveying tube, hose or conduit through which compactible dusts or similar powdered substances, normally having a tendency to collect into packs can be readily pumped. The tube having elastic or expansible side walls is connected to the discharge side of a pump which is arranged to collect and force the dust to travel through the tube by pneumatic pressure. Preferably the loading end of the tube or hose is mounted on a portable dust gathering mechanism as illustrated in the accompanying drawings and the tube is of sufficient length to extend to the delivery station at its discharge end. This enables dust-like substance to be picked up and conveyed by air pressure through the tube or conduit, which comprises expansible side walls, into a box-car or the like conveyance without encountering clogging or sticking of the dust.

The invention will be understood more readily by reference to the accompanying drawings, which illustrate an installation of the equipment of the invention as employed for the handling of pigment zinc oxide, although it will be understood that the equipment is usable equally well for handling any other dust-like product, especially those of a compactible nature.

In the drawings,

Fig. 3 is a sectional elevation illustrating normal passage of dust through the equipment.

Fig. 4 is a sectional elevation through a standard form of inelastic pipe illustrating its plugged condition.

Fig. 5 is a sectional elevation through the improved elastic tube illustrating its action under the influence of a normally plugging mass of dust.

Fig. 6 is an elevation of a type of coupling suitable for use in connection with the improved apparatus.

Fig. 7 is a sectional elevation thereof, taken on the line 7—7 of Fig. 6, showing further details of construction.

Fig. 8 is an end view of a section of flexible hose showing coupling flanges.

Figure 1:
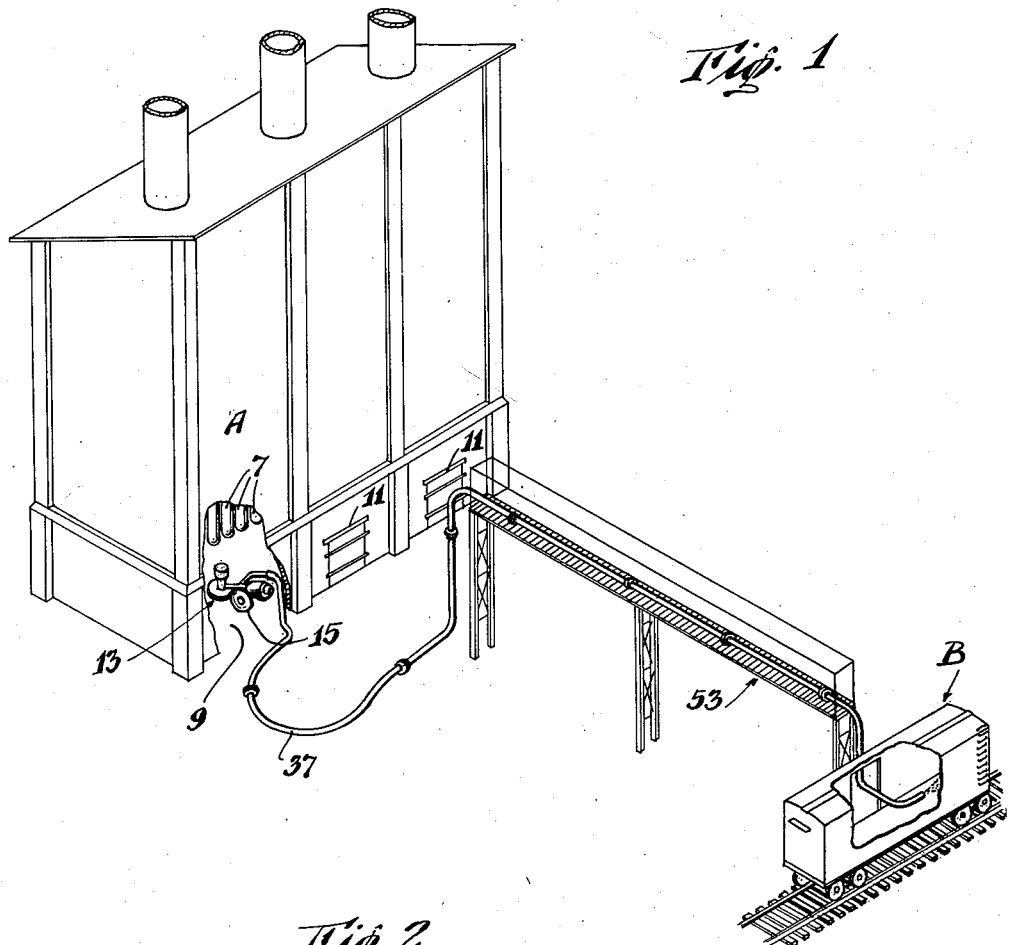
Fig. 1 represents an isometric view of the equipment delivering dust from a bag-house bin to a box car for shipment, parts being broken away for clarity.

Referring more particularly to the drawings, A represents any source of dust-like material which is to be discharged at a remote station such as, for example, box-car B.

The source A is illustrated as a conventional bag-house such as is used commonly for the collection of metallurgical fumes or other finely divided particles passing therein by way of a gas stream issuing from a metallurgical furnace. However, it will be understood, as has been pointed out above, that the invention is usable advantageously for the transportation of powdered or dust-like materials the particles of which tend to gather or collect into packs.

If the source A is a conventional metallurgical bag-house the dust shaken from bags 7 will collect in storage compartments or bins 9 below the bags. Each of these bins 9 is provided with a door 11, which closes the entrance to each bin.

The dust handling equipment comprises a dust-collecting and discharging machine 13 of any desired standard type, which is mounted on wheels 15 for enabling the machine to be moved to any part of the bin.

Figure 2:
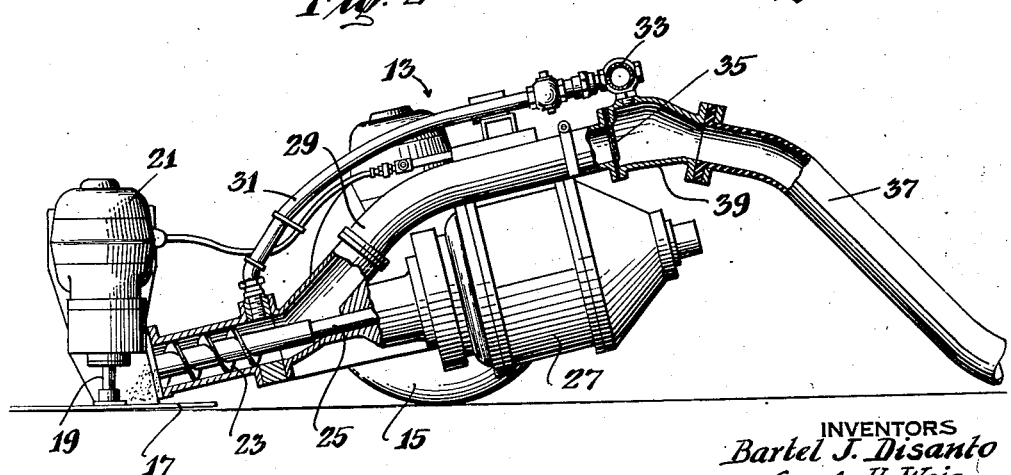
Fig. 2 is a sectional elevation of a standard type of machine for collecting and delivering dust through the improved delivering means, the view illustrating the connection of the elastic hose to the machine.

A suitable type of machine is illustrated in Fig. 2, wherein there is shown a gathering disc 17 rotated by shaft 19, which is suitably driven by a motor 21. The gathering disc 17 when rotated picks up the dust particles and feeds the same to the outer end of a screw 23 which mechanically conveys the particles back into the housing of the machine.

As shown in Fig. 2, the screw 23 is mounted on a shaft 25, which is driven by a motor 27, and the screw chamber is in communication with a dust discharge conduit 29, through which the dust is blown by compressed air entering the conduit 29 through pipe 31 from connection 33, which leads from a compressor, not shown. The conduit 29 is provided with a gravity-type check valve 35 which is open during operation, but which closes responsively to stoppage of the air compressor, thereby preventing back pressure in the line 37 from blowing dust back into the screw 23.

Further details of this mechanism need not be described, as it is a standard construction, procurable on the open market. The check valve 35 is housed in a fitting 39 to which is coupled the freely flexible elastic tube or pipe 37, which forms a hose through which the dust is blown by the compressor to the remote station B. The normal condition of operation is shown in Fig. 3, wherein there is illustrated in somewhat exaggerated manner, slugs 41 of compactible dust being blown through the delivery pipe or hose 37 by the pressure of air from the compressor.

Now as on passing through the hose 37, if the passage of the dust is obstructed, the first action is to build up a plug 43 of the said material, and, if the delivery tube is unyielding, such as if it is a metallic tube, as indicated at 37', this plug completely obstructs the tube and forces cessation of operations until the tube has been taken down, cleaned out, and replaced,—when almost immediately the same trouble may again arise.

But when, as is the case of the improved construction, the pipe 37 is elastic, the pressure of air behind the plug will cause the tube to expand around the obstruction, somewhat as is shown in Fig. 5, thereby forming an enlarged air passage 47 around the obstructing plug, so that the air which continues to pass around the plug will take off particles of the dust from the plug, so that the latter is worn away to the extent that it will pass freely through the pipe, as is indicated at 49 and 51. All this takes place substantially instantaneously, so that there is no interruption to the operation.

Wherever needed a supporting scaffold 53 may be used to carry the elastic-wall pipe or hose 37. The elasticity of the hose has also the advantage that it may be passed into a closure, such as box-car B, while allowing the opening into such closure to be shut more tightly than heretofore, thereby minimizing dust losses into the outside air. It will be obvious that immediately upon release of the obstruction, the elasticity of the pipe 37 returns it to its normal diameter. The tube or hose 37 may be made up of any elastic material, but molded elastic or gum rubber is found to be very suitable.

Obviously, the hose 37 may be composed of sections coupled together where the hose is of substantial length. In practice, the couplings that are employed preferably also are yieldable in character, although they may be made rigid in themselves in which event the thickness of the coupling structure is reduced to such an extent that they in no way interfere with the passage of the material through the hose.

The coupling structure is made up of thin flexible flanges 55, 55, which are made of elastic rubber, the same as the hose 37, the flanges 55 being molded with the hose. These flanges 55 are adapted to register with one another when the hose sections are coupled together, and are secured by bolts 57 passing through registering holes in the flanges 55, 55, and through corresponding holes 58 in split reinforcing backing rings 59, 59, which rings may cover substantially all of the exposed surfaces of the flanges 55, 55, or may be, as shown, only peripheral rings around the outer edge of the flanges, leaving a substantial portion thereof flexibly exposed or unsupported in order to allow for a continuous "breathing" action throughout the entire length of hose while in service.

However, as has been said before, the backing rings 59 may extend over the entire flange, in which case the assembled couplings are maintained in such thickness as is compatible with handling so as to be wholly insignificant in comparison with the total length of the tube 37.

What is claimed is:

1. Dust handling equipment comprising the combination with dust-pumping mechanism for delivering a stream of dust-like material from a supply thereof to a remote handling station, of a tube for transporting the said material from the said mechanism to the said station, the said tube having the stream of material passing therethrough during its substantially entire transit to the said station, the said tube being freely flexible and having an elastic wall which is adapted to expand readily under pressure of the said mechanism around a body of compacted dust tending normally to plug the tube, thereby enabling air from the said mechanism to pass around the said body to break it up and enable the previously compacted dust to be blown through and out of the tube at the said handling station.

2. Dust handling equipment comprising the combination with dust-pumping means adapted to deliver a stream of dust-like material from a supply thereof to a remote handling station, of an elastic-walled tube connected to the said means through which tube the said material passes in transit to the said station, the wall of the tube being adapted to expand under air pressure from the said means around an obstruction in the tube thereby allowing the obstruction to be blown from the tube.

3. Dust handling equipment comprising the combination with dust-pumping means adapted to deliver a stream of dust-like material from a supply thereof to a remote handling station, of a tube extending from the said means to the said station, the walls of said tube through which the dust passes in transit to the station being composed of expansible material and adapted to expand readily under pressure of the said pumping means around a body of compacted dust tending normally to plug the tube, thereby allowing the obstruction to be moved along through said tube and discharged.

4. Dust handling equipment comprising the combination with dust-pumping means adapted to deliver a stream of dust-like material from a supply thereof to a remote handling station, of a dust-conveying hose extending from the pumping means to the said station, said hose having yieldable walls allowing the hose to expand around a compacted body of dust to aid in its disintegration and discharge therefrom, said hose being continuously and automatically self-cleaning under substantially normal air pressure from the pumping means, thereby obviating any substantial cessation of flow of the material through the hose during operation, and means for connecting the hose to the said pumping means on its discharge side.

5. Dust handling equipment comprising the combination with dust-pumping means adapted to deliver a stream of dust-like material from a supply thereof to a remote handling station, of a dust-conveying tube extending from the said pumping means to the station, the walls of said tube being formed of readily expansible and contractable material which is adapted to expand under the pressure created by said pumping means adjacent a body of compacted dust tending to obstruct the tube to effect the removal of the obstruction, and means for connecting the hose to the said pumping means on its discharge side.

6. Dust handling equipment comprising the combination with dust-pumping means adapted to deliver a stream of dust-like material from a supply thereof to a remote handling station, of a dust-conveying hose extending from the said means to the station, said hose having readily expansible and contractable walls so that the tube expands under the pressure created by said pumping means adjacent a body of compacted dust tending to clog the hose to effect the removal of the obstruction from said hose, and means for connecting the hose to the pumping means at its discharge side, the said hose being composed of coupled sections, means for releasably coupling the said sections together, the coupling means including annular elastic flanges on the hose, for allowing the walls of said coupling to expand around an obstruction in the coupling portion of the hose to free said obstruction and prevent plugging of the hose, means for holding the cooperating flanges together, and means for releasably securing together the said flanges and annular holding means.

7. Dust handling equipment comprising the combination with dust-pumping means adapted to deliver a stream of dust-like material from a supply thereof to a remote handling station, of a dust-conveying hose extending from the said means to the station, said hose having elastic walls which are adapted to expand under pressure produced by said pumping means adjacent an obstruction in the hose, thereby allowing the obstruction to be moved along through said hose and discharged therefrom, means for connecting the hose to the pumping means at its discharge side, said hose consisting of detachably interconnected sections, means for releasably coupling the said sections together, the coupling means including annular elastic flanges on the hose for allowing the coupling to expand around an obstruction in the coupling portion of the hose to free the same, supporting collars for the flanges for enabling the flanges to be coupled together, the flanges and collars being provided with holes adapted to register for the passage therethrough of securing means for locking the parts together, and releasable securing means for the said parts.

8. Dust handling equipment comprising the combination with dust-pumping means adapted to deliver a stream of dust-like material from a source of supply to a remote station, of a conduit connected to said pumping means through which said dust material passes in transit to said station, said conduit being made up of hollow sections joined together by couplings, said hollow sections and coupling means being formed of yieldable material which is readily expanded by the pressure developed by said pumping mechanism to free a body of compacted dust material tending to clog the conduit, thereby enabling the passage of other dust particles around said obstruction causing its disintegration and movement therealong through said conduit.

BARTEL J. DI SANTO.
GEORGE H. WEIS.